A. F. OSTERLIND.
AUTOMATIC STARTER FOR COMBUSTION ENGINES.
APPLICATION FILED OCT. 27, 1910.
1,100,697.
Patented June 16, 1914.
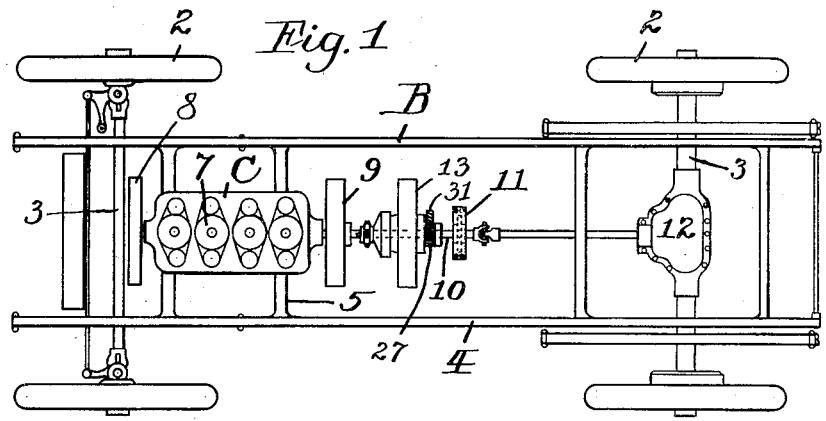
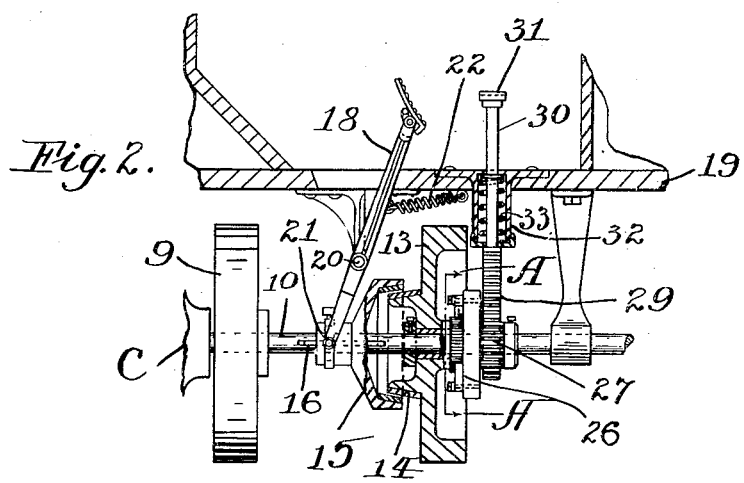
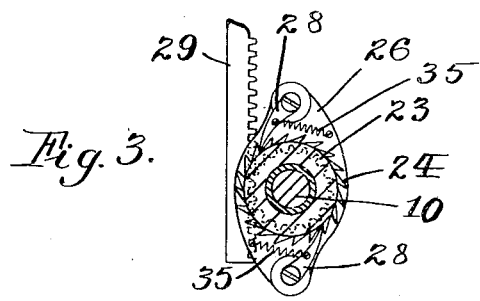
Witnesses:
Jule Donovan
H. L. Fischer
Inventor:
August F. Osterlind,
by: [signature]
Attorney.

UNITED STATES PATENT OFFICE.

AUGUST F. OSTERLIND, OF ST. PAUL, MINNESOTA.

AUTOMATIC STARTER FOR COMBUSTION-ENGINES.

1,100,697.　　　　Specification of Letters Patent.　　Patented June 16, 1914.

Application filed October 27, 1910. Serial No. 589,338.

*To all whom it may concern:*

Be it known that I, AUGUST F. OSTERLIND, a citizen of the United States, residing at St. Paul, in the county of Ramsey and State of Minnesota, have invented a new and useful Improvement in Automatic Starters for Combustion-Engines, of which the following is a specification.

My invention relates to improvements in engine starters for internal combustion engines, particularly of the class used in connection with automobiles and similar vehicles.

My object is to provide a means for cranking the engine easily and surely without getting out of the vehicle and without danger to the operator. I attain this result in a device that is simple in construction, easily applied to an automobile and operated by means convenient to the driver of the car.

In the drawings with which I have illustrated my device and which form part of the specification, Figure 1 is a plan of the frame of an automobile having an engine fitted with my device; Fig. 2 is a sectional elevation of the parts of my device, and Fig. 3 is a section on the line A—A, Fig. 2.

In the above drawings are shown an automobile frame B having wheels 2 with axles 3 on which are mounted the side plates 4 and cross pieces 5 carrying the engine C. The engine C has cylinders 7, a fan 8, a flywheel 9 and a crank shaft 10 connecting through the drive clutch 11 with the gear box and differential 12 mounted on the axle 3 of the rear wheels of the machine. This structure as described, is of ordinary construction. The structure incorporating the novel features of my invention consists of fly wheel or momentum wheel 13 journaled on the crank shaft 10 and independent of the engine C. This fly wheel 13 carries the male portion 14 of a friction clutch, the counterpart of which is also mounted on the crank shaft 10, being keyed thereto by a feather 16 and adapted to be thrown into engagement with the fly wheel 13, by a foot lever 18 extending above the floor 19 of the car convenient to the foot of the driver. This lever is mounted on a pivot 20 bracketed to the floor 19 of the car and operates the clutch 15 by means of a trunnion 21 at its other end. The clutch 15 is thrown out of engagement with the fly wheel 13 through the same lever which is acted upon by the tension spring 22, thus holding the clutch 15 in its disengaging position when in normal condition and not under pressure by the driver. Integral with the fly wheel is a ratchet wheel 23 having teeth 24. A spindle 26 journaled on the shaft 10 and integral with a pinion 27, carries pawls 28 engaging the teeth 24 of the ratchet wheel 23, forming an intermittent gripping clutch through which the flywheel 13 is driven. The spindle 26 and pinion 27 are reciprocated in co-operation with a vertical rack 29 operated by a rack bar 30 passing up through the floor 19 of the car and a guide casing 32 attached to the floor, and terminating in a tread 31 convenient to the driver. By pressing his foot on the tread 31 the driver forces the rack 29 downward rotating the pinion 27, spindle 26, ratchet 23 and fly wheel 13. Upon releasing the pressure on the tread 31 the spindle 26 and pinion 27 together with the rack 29 are returned to their original position by the action of a spring 33 acting upon the rack bar 30. During the return movement of the parts, the pawls 28 carried by the spindle 26 slip on the teeth 24 of the ratchet wheel, being held in contact therewith by the springs 35, in readiness to engage the teeth 24 when the pressure on the tread 31 is renewed. The movement of the fly wheel 13 encountering only the friction of the pawls 28, will continue to revolve, and a repetition of the action of the ratchet 23 through pressure on the tread 31 will gradually increase the speed of the fly wheel 13 until its momentum is sufficient to revolve the crank shaft of the engine C which constitutes the ordinary cranking motion of an engine. The momentum of the fly wheel 13 is imparted to the crank shaft 10 of the engine C by pressing forward the foot lever 18 and thus engaging the clutch 15 keyed to the shaft 10, with the fly wheel 13.

In accordance with the patent statutes I have described the principles of operation of my invention together with the apparatus which I now consider to represent the best embodiment thereof but I desire to have it understood that the construction shown is only illustrative and that the invention can be carried out by other means and applied to uses other than those above set forth within the scope of the following claims.

Having described my invention, what I claim as new and desire to protect by Letters Patent is:—

1. In a device of the class described, the combination with an internal combustion engine, having a crank shaft and a fly-wheel thereon, of a momentum wheel revoluble on said shaft, a reciprocating drive for the momentum wheel, a clutch member on said wheel, a second clutch member on said shaft, means for manually engaging said clutch members to connect said momentum wheel and shaft and impart a starting torque to the latter, and means for disengaging said members to disconnect the momentum wheel and shaft when movement of said shaft is initiated.

2. In a device of the class described, the combination with an internal combustion engine, having a crank shaft and a fly-wheel thereon, of a momentum wheel revoluble on said shaft, a suitably supported foot-lever adapted to slide vertically, said lever being in operative connection with said wheel and adapted to rotate the same in one direction, a clutch member on said wheel, a second clutch member on said shaft, means for engaging said clutch members to connect said momentum wheel and shaft and impart a starting torque to the latter and means for disengaging said members to disconnect the momentum wheel and shaft when movement of said shaft is initiated.

3. In a device of the class described, the combination with an internal combustion engine, having a crank shaft and a fly-wheel thereon, of a momentum wheel revoluble on said shaft, intermittent grip mechanism for rotating said wheel in one direction, having a pinion, a rack having its teeth meshed with the teeth of said pinion and provided with a foot receiving element, a suitably supported vertical guide in which said rack slides and a spring engaging said guide and rack for returning the latter to normal position, a clutch member on the momentum wheel, a second clutch member on said shaft, means for engaging said clutch members to connect said momentum wheel and shaft and impart a starting torque to the latter and means for disengaging said members to disconnect said momentum wheel and shaft when movement of said shaft is initiated.

In testimony whereof, I have signed my name to this specification, in the presence of two subscribing witnesses.

AUGUST F. OSTERLIND.

Witnesses:
H. L. FISCHER,
F. G. BRADBURY.